(12) United States Patent
Sogabe (10) Patent No.: US 7,540,445 B2
(45) Date of Patent: Jun. 2, 2009

(54) TAPE CARTRIDGE

(75) Inventor: Teruo Sogabe, Osaka (JP)

(73) Assignee: Hitachi Maxell, Ltd., Ibaraki-Shi (JP)

( * ) Notice: Subject to any disclaimer, the term of this patent is extended or adjusted under 35 U.S.C. 154(b) by 153 days.

(21) Appl. No.: 11/703,735

(22) Filed: Feb. 8, 2007

(65) Prior Publication Data

US 2007/0295849 A1 Dec. 27, 2007

(30) Foreign Application Priority Data

Feb. 8, 2006 (JP) ............................ 2006-031488

(51) Int. Cl.
*G11B 23/04* (2006.01)
(52) U.S. Cl. .................. 242/346.2; 242/566; 242/615.2
(58) Field of Classification Search ................ 242/346, 242/346.2, 338, 615.2, 348, 348.2, 566; 360/132
See application file for complete search history.

(56) References Cited

U.S. PATENT DOCUMENTS

| | | | | |
|---|---|---|---|---|
| 1,807,274 | A | * 5/1931 | Beidler | |
| 3,610,551 | A | * 10/1971 | Protas | 242/346.2 |
| 4,136,839 | A | * 1/1979 | Walter | |
| 4,958,781 | A | * 9/1990 | Ueda et al. | 242/346.2 |
| 5,490,029 | A | * 2/1996 | Madsen et al. | 360/132 |
| 7,000,862 | B2 | 2/2006 | Takahashi et al. | |
| 2003/0001037 | A1* | 1/2003 | Plourde et al. | 242/346.2 |
| 2004/0031875 | A1* | 2/2004 | Nonomura | 242/348 |
| 2006/0076446 | A1* | 4/2006 | Sogabe | 242/348 |
| 2008/0067272 | A1* | 3/2008 | Inugai | 242/348 |

FOREIGN PATENT DOCUMENTS

| | | |
|---|---|---|
| JP | 11-339438 A | 12/1999 |
| JP | 2001-118355 A | 4/2001 |
| JP | 2003-45145 A | 2/2003 |
| JP | 2004-103158 A | 4/2004 |

\* cited by examiner

*Primary Examiner*—William A Rivera
(74) *Attorney, Agent, or Firm*—Birch, Stewart, Kolasch & Birch, LLP (57) ABSTRACT

A tape cartridge according to the present invention includes a case, a reel disposed in the case, a tape that can be wound around the reel in such a manner as to be fed out freely, and a guide member for tape guidance disposed in the case. The guide member is supported by a support member, which is held at a predetermined position inside the case and supported by the reel without interfering with a rotation of the reel.

12 Claims, 7 Drawing Sheets

TAPE CARTRIDGE

BACKGROUND OF THE INVENTION

1. Field of the Invention

The present invention relates to a tape cartridge.

2. Description of Related Art

Figure 9:
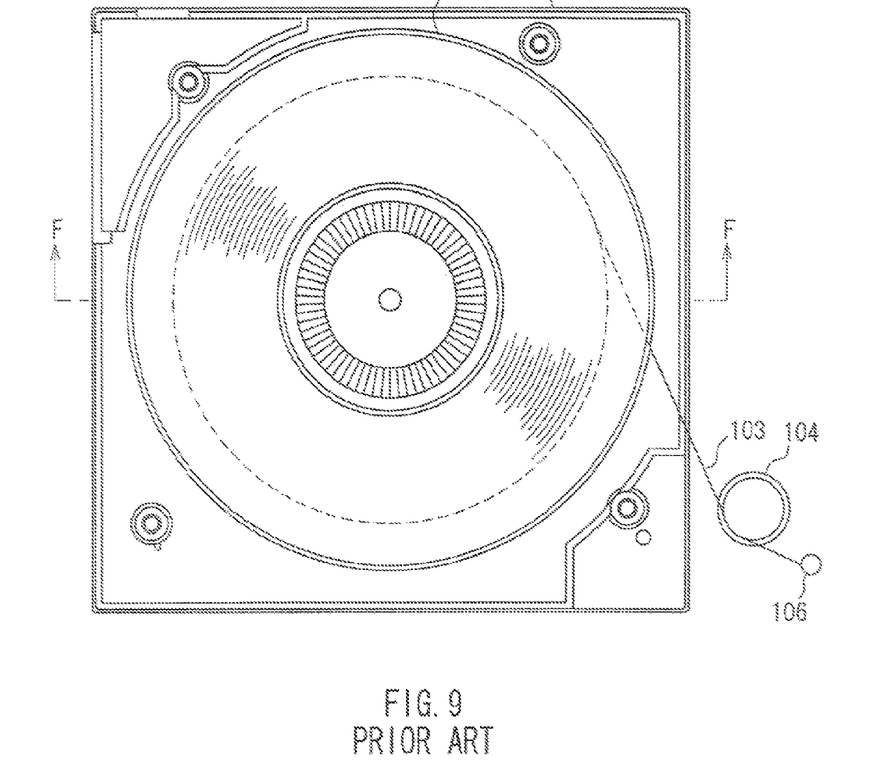
FIG. 9 is a conceptual plan view for describing an internal structure of an example of a conventional tape cartridge.
Figure 10:
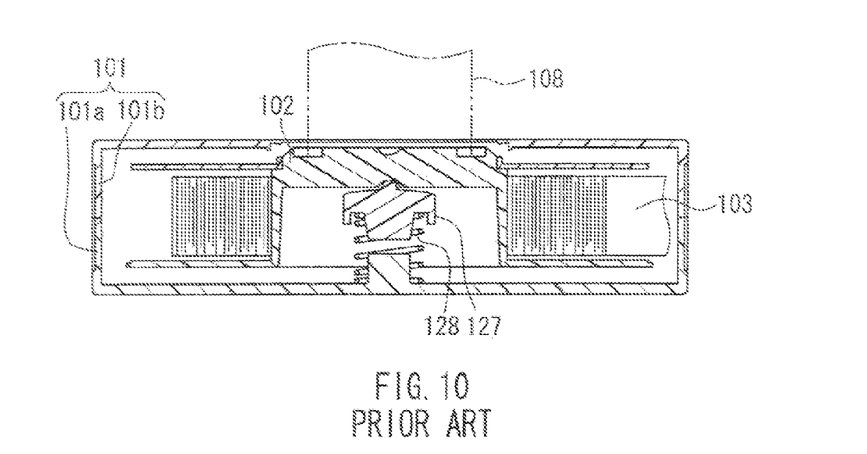
FIG. 10 is a sectional view of FIG. 9, taken along a line F-F.

FIG. 9 is a conceptual plan view showing an internal structure of a conventional tape cartridge in which a single reel having an upper flange and a lower flange is housed rotatably in a case. FIG. 10 is a sectional view showing the tape cartridge shown in FIG. 9, taken along a line F-F. It should be noted that, in FIG. 9, a second container 101b of a case 101 in FIG. 10 is omitted. Further, although a first container 101a is disposed below the second container 101b in FIG. 10, the first container 101a is disposed above the second container 101b in ordinary use.

A reel 102 is pressed and biased upward in FIG. 10 by a compression coil spring 128 acting via a shaft 127. However, in a running state, the reel 102 is raised toward the first container 101a by a drive shaft 108 of a drive and rotates at a position slightly away from the second container 101b. When the reel 102 rotates, a tape 103 is wound around the reel 102 or fed out from the reel 102. A metal leader 106 is fixed to the fed-out end of the tape, and when the tape cartridge is loaded in the drive, the leader 106 is grasped by a coupler of the drive. In this way, the tape 103 is supplied to a drive system of the drive. In FIG. 9, numeral 104 denotes a guide roller of the drive system of the drive.

Now, in the conventional tape cartridge described above, any of the following structures (1) to (3), for example, has been adopted for smoother tape winding:

(1) the structure in which through holes or grooves are provided in part of the flanges of the reel in order to release the air that is entrained in the tape when winding the tape (in the following, also referred to as "the entrained air") (see JP 2001-118355 A, for example);

(2) the structure in which the gap between the upper and lower flanges of the reel is reduced so as to decrease the clearance between the tape and each of the flanges, thereby restricting the position of the tape with the flanges; and (3) the structure in which the case is provided with a guide roller so as to wind the tape around the reel at a predetermined angle (see JP 2003-45145 A, for example).

However, in the conventional cartridge, intrinsic irregularities of the tape, for example, uneven thickness, curve, etc. of the tape have caused the instability of a running position of the tape, resulting in uneven tape winding. Therefore, the above-described through holes or groves for releasing the entrained air effectively when the tape and the flanges are in close contact with each other have not functioned sufficiently. In the case where the gap between the upper and lower flanges is reduced, vertical variation in the running position of the tape may cause a tape edge to contact one of the flanges, leading to the problem of the tap being damaged. In the case where the guide roller or the like is used to restrict the running position, etc. of the tape, since the running stability of the tape improves to some degree, the smoothness in tape winding also improves. However, the degree of improvement has not been sufficient for the following reason.

The reel 102 is movable vertically or horizontally to a certain degree. On the other hand, since the guide roller is fixed to a predetermined position of the case, it cannot follow the inclination, horizontal displacement, vertical movement or the like of the reel. Thus, the running position, etc. of the tape cannot be restricted stably using the guide roller. In fact, it has been known that the engagement between a driving gear provided to the drive shaft of the drive and its corresponding engaging gear of the reel varies every time, so that the reel may be inclined or displaced in an arbitrary direction in some cases.

With the foregoing in mind, the present invention provides a tape cartridge with smoother tape winding by achieving stabilized running of the tape without being affected considerably by the inclination, positional displacement, etc. of the reel.

SUMMARY OF THE INVENTION

A tape cartridge according to the present invention includes a case, a reel disposed in the case, a tape wound around the reel in such a manner as to be fed out freely, and a guide member for tape guidance disposed in the case. The guide member is supported by a support member. The support member is held at a predetermined position inside the case and supported by the reel without interfering with a rotation of the reel.

DETAILED DESCRIPTION OF THE INVENTION

In an example of the tape cartridge according to the present invention the support member includes a bearing portion, and this bearing portion is disposed in contact with the reel, so that the support member is supported by the reel without interfering with the rotation of the reel. The guide member is, for example, a guide roller supported by the support member in such a manner as to be rotatable around a center shaft of the guide roller.

In an example of the tape cartridge according to the present invention, it is preferable that a position of the support member is restricted by a predetermined corner in the case. Utilizing a predetermined corner in the case in this way is preferable, because no other means for preventing the rotation of the support member needs to be provided.

In an example of the tape cartridge according to the present invention, the reel includes a cylindrical hub portion with a bottom, and includes an annular step portion formed on an outer periphery near the bottom of the hub portion, and the bearing portion is disposed in contact with this annular step portion. This mode is preferable because the support member can be supported by the reel easily without increasing the thickness of the case.

In an example of the tape cartridge according to the present invention, the support member includes an arm portion provided in the bearing portion, and the guide member is attached to the arm portion. The arm portion is provided so as to extend from the bearing portion in a direction perpendicular to a height direction of the hub portion. In the case where the arm portion is formed of a plate-like pedestal portion, for example, the guide member is attached to the pedestal portion.

Also, the arm portion includes a pedestal portion to which the guide member is attached, and a rail that allows the pedestal portion to slide according to a change in a diameter of a wound portion of the tape. In this case, it is preferable that the tape cartridge further includes a pressing member that allows a non-wound portion of the tape to be pressed against the wound portion at a contact starting point of the non-wound portion and the wound portion. The pressing member is attached to the pedestal portion, for example. In this mode, the tape whose running position, etc. has been stabilized by the guide member always travels toward the reel 2 at a constant angle of approach while following the positional displacement, inclination, etc. of the reel. Then, the tape 3 is wound around the reel while the entrainment of the air is accompanied by winding is suppressed by the pressing of the pressing member 16 at the instant when the tape reaches the wound portion. Thus, it is possible to provide a tape cartridge with still smoother tape winding.

As the above-described pressing member, a touch roller attached to the pedestal portion in such a manner as to be rotatable around a center shaft of the touch roller is preferable.

In the case where the support member includes the guide member and the pressing member, it is preferable that the pressing member and the guide member are attached to the pedestal portion such that a running direction of the tape running from the guide member toward the pressing member and a radial direction of the wound portion passing through the contact starting point cross at right angles. Also, it is preferable that a moving direction of the pedestal portion that slides along the rail is parallel with the radial direction of the wound portion passing through the contact starting point. In this case, the contact area of the pressing member and the tape can be made minimal, so that it is possible to suppress the adverse effect on the smooth tape winding due to the shape, etc. of the pressing member.

In an example of the tape cartridge according to the present invention, the bearing portion of the support member has a ring-like outer shape. It is preferable that the support member includes a center-of-gravity adjusting portion such that a center of the bearing portion is at a center of gravity of a structure constituted by the support member and the guide member. Moreover, in the case where the pressing member is attached to the pedestal, it is preferable that the support member includes a center-of-gravity adjusting portion such that a center of the bearing portion is at a center of gravity of a structure constituted by the support member, the guide member and the pressing member. If the center of the bearing portion and the above-noted center of gravity are misaligned, the reel is inclined, so that the rotation of the reel becomes irregular and unstable. Therefore, it is preferable that the support member includes the above-described center-of-gravity adjusting portion The following is a description of exemplary embodiments of the present invention, with reference to FIGS. 1 to 8.

Embodiment 1

Figure 1:
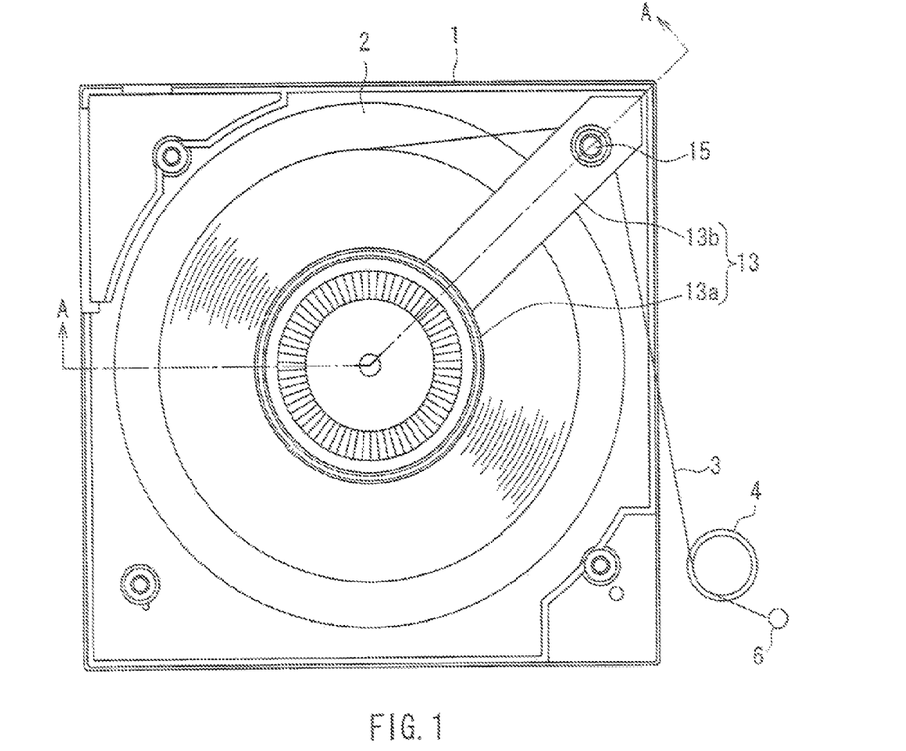
FIG. 1 is a conceptual plan view for describing an internal structure of an example of a tape cartridge according to Embodiment 1.
Figure 2:
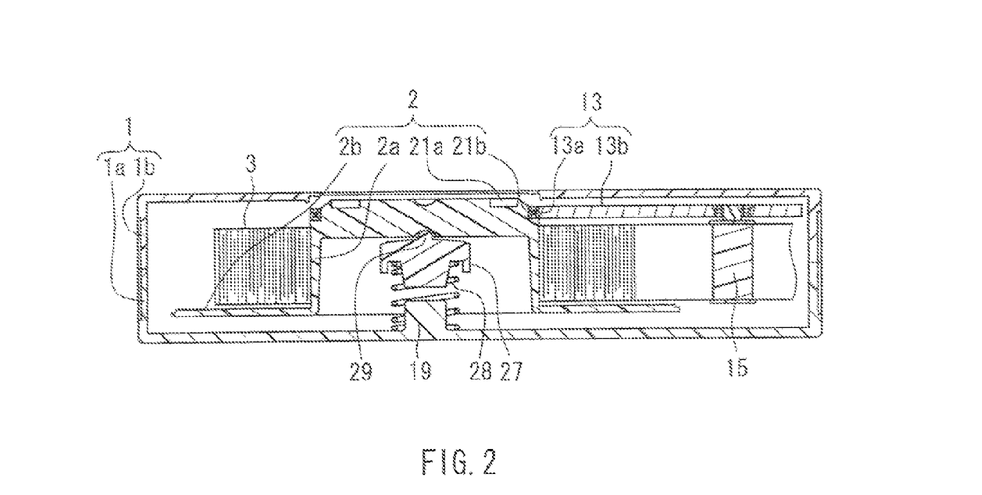
FIG. 2 is a sectional view showing the tape cartridge shown in FIG. 1, taken along a line A-A.
Figure 3A:
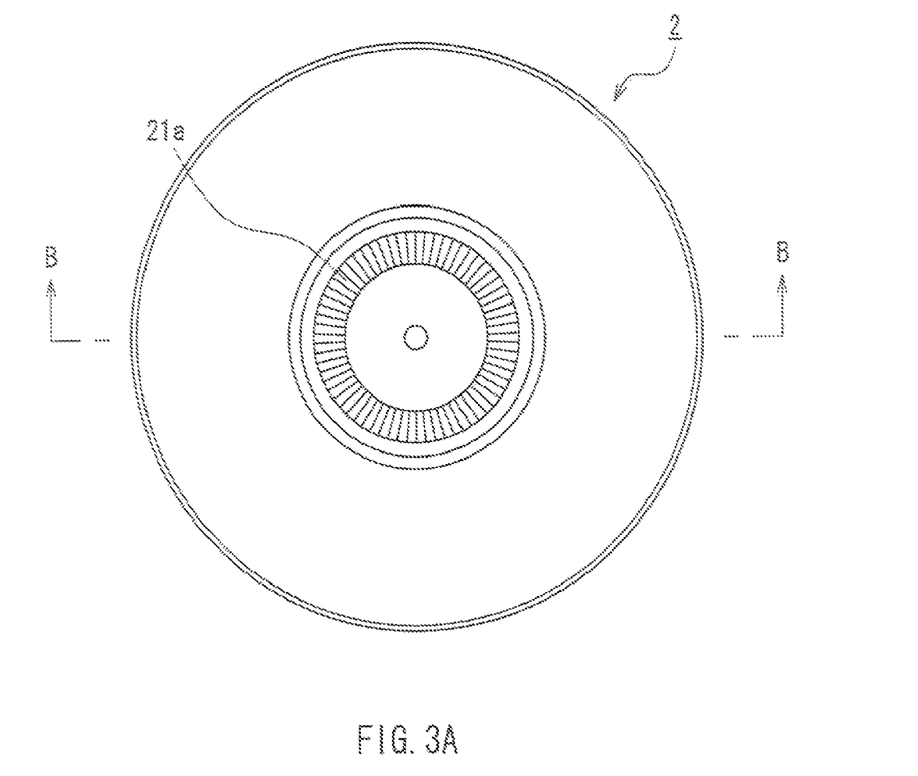
FIG. 3A is a plan view showing a reel constituting the tape cartridge shown in FIG. 1.
Figure 3B:
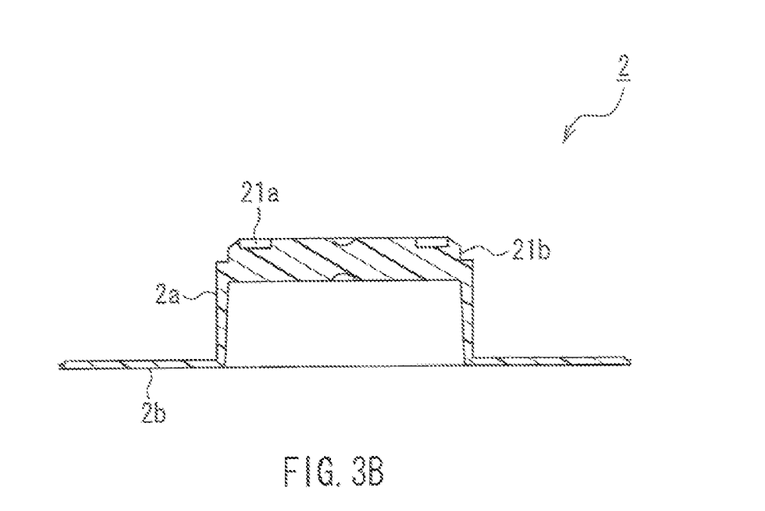
FIG. 3B is a sectional view of FIG. 3A, taken along a line B-B.

FIG. 1 is a conceptual plan view for describing an internal structure of an example of a tape cartridge according to the present embodiment, and FIG. 2 is a sectional view showing the tape cartridge shown in FIG. 1, taken along a line A-A. The tape cartridge according to the present embodiment is a single-reel tape cartridge for data backup in a computer, for example. FIG. 3A is a plan view showing a reel constituting the tape cartridge according to the present embodiment, and FIG. 3B is a sectional view of FIG. 3A, taken along a line B-B. For convenience of description, in FIG. 1, a second container 1b shown in FIG. 2 is omitted. Further, although a first container 1a is disposed below the second container 1b in FIG. 2, the first container 1a is disposed above the second container 1b in ordinary use.

As shown in FIG. 1, the tape cartridge according to the present embodiment includes a case 1 and a magnetic tape 3 (in the following, also simply referred to as "the tape 3") housed in the case 1. The tape 3 is wound around a reel 2, which is housed rotatably in the case 1. The tape 3 wound around the reel 2 can be fed out from the reel 2 and drawn outside the case 1. A metal leader 6 is fixed to the fed-out end of the tape 3, and when the tape cartridge is loaded in a drive, the leader 6 is grasped by a coupler of the drive. In FIG. 1, numeral 4 denotes a guide roller of a drive system of the drive.

As shown in FIG. 2, the case 1 is formed as a rectangular box by combining the first container 1a and the second container 1b so as to form an internal space and fastening them together using screws or the like. The case 1 has an opening portion for drawing the tape 3 out of the case 1 and a door (not shown) for opening and closing the opening portion. A bottom of the first container 1a is provided with a guide protrusion 19 having an outer diameter smaller than the inner diameter of a compression coil spring 28, which will be described later. This guide protrusion 19 is inserted into the compression coil spring 28 (see FIG. 1), thereby suppressing a positional displacement of the compression coil spring 28.

The reel 2 has a hub portion 2a around which the tape 3 is wound, and a disk-like flange 2b formed as one piece with the hub portion 2a. The hub portion 2a is formed substantially in the shape of a cylinder having a bottom, with a cavity inside. In the cavity, a shaft 27 and the compression coil spring 28 are disposed. In the case 1, the reel 2 is pressed and biased upward in FIG. 2 by the compression coil spring 28, which acts via the shaft 27. Thus, the reel 2 is prevented from rotating freely when not in use. The shaft 27 is provided with a protrusion 29, which is fitted rotatably in a concave portion provided in an inner surface of the bottom of the hub portion 2a. Accordingly, the reel 2 is rotatable around the shaft 27.

As shown in FIGS. 3A and 3B, in the reel 2, an engaging gear 21a that can be engaged with a driving gear (not shown) of the drive is provided on an outer surface of the bottom of the hub portion 2a. The outer surface of the bottom of the hub portion 2a is exposed to an outside of the case from the opening portion of the bottom of the second container 1b (see FIG. 2). The reel 2 rotates while the engaging gear 21a is engaged with the driving gear of the drive shaft of the drive inserted through that opening portion into the case 1. When the reel 2 rotates, the tape 3 is wound around the reel 2 or fed out from the reel 2.

As shown in FIGS. 1 and 2, the tape cartridge according to the present embodiment includes a guide roller 15, for example, as a guide member 15 for tape guidance disposed in the case 1. The guide roller 15 is supported by a support member 13. The support member 13 includes a bearing portion 13*a* having, for example, a so-called bearing structure constituted by an outer race, an inner race, rolling elements placed between the inner and outer races, and retainers for separating the rolling elements. The inner race of this bearing portion 13*a* alone is fixed to the reel 2, whereby the support member 13 is supported by the reel 2 without interfering with the rotation of the reel 2. In the example shown in FIGS. 1 and 2, the bearing portion 13*a* has a ring shape and is disposed in contact with an annular step portion 21*b* formed on an outer periphery near the bottom of the hub portion 2*a*.

Figure 4A:
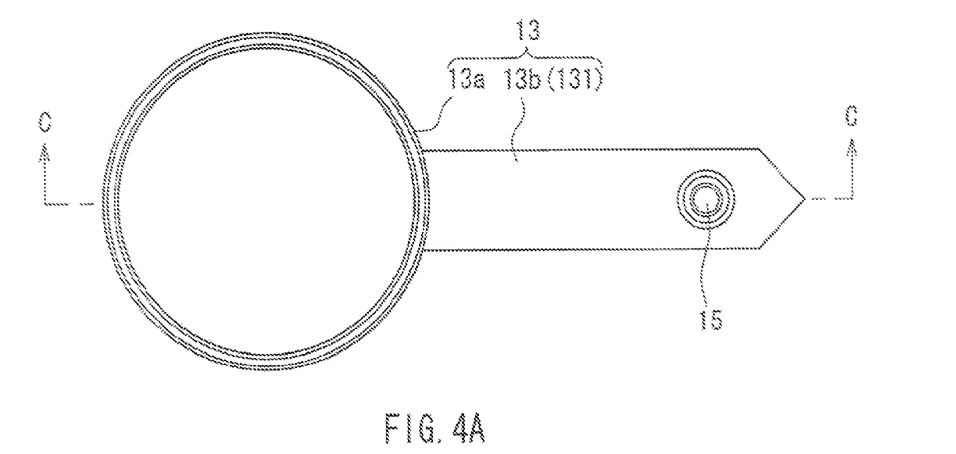
FIG. 4A is a plan view showing a support member constituting the tape cartridge shown in FIG. 1 and a guide roller supported by the support member.

Now, referring to FIGS. 4A and 4B, examples of the support member 13 and the guide member (the guide roller 15) supported by the support member 13 will be described. FIG. 4A is a plan view showing the support member 13 and the guide roller 15 supported by the support member 13, and FIG. 4B is a sectional view of FIG. 4A, taken along a line C-C.

Figure 4B:
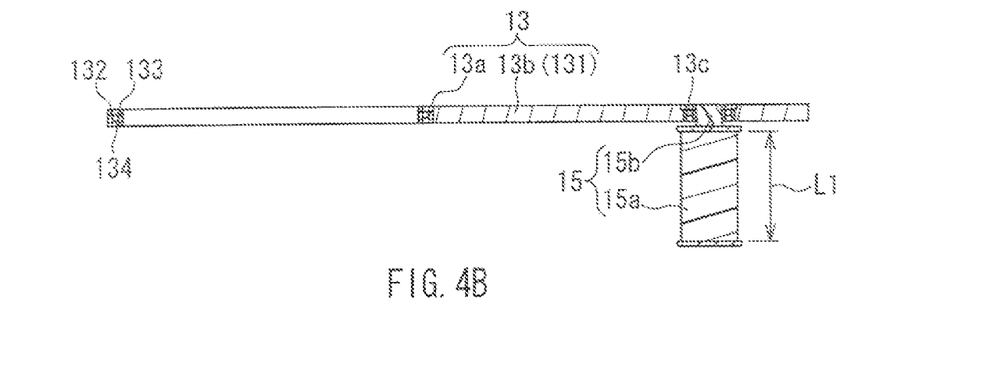
FIG. 4B is a sectional view of FIG. 4A, taken along a line C-C.

As shown in FIGS. 4A and 4B, the support member 13 includes the ring-shaped bearing portion 13*a* and an arm portion 13*b* provided so as to extend from the bearing portion 13*a* in a direction perpendicular to a height direction of the hub portion 2*a* (see FIG. 1). In the examples shown in FIGS. 4A and 4B, the arm portion 13*b* is formed of a plate-like pedestal portion 131. The guide roller 15 is attached to the side of one principal surface (a surface on the side of the tape) of the pedestal portion 131. A surface of the bearing portion 13*a* on the side of the first container 1*a* and a surface of the pedestal portion 131 on the side of the first container 1*a* are in the same plane, and a surface of the bearing portion 13*a* on the side of the second container 1*b* and a surface of the pedestal portion 131 on the side of the second container also are in the same plane (see FIG. 2). In other words, the support member 13 formed of the bearing portion 13*a* and the pedestal portion 131 is like a plate having a single hole. Further, the plate-like support member 13 is disposed in parallel with the flange 2*b* (the bottom of the first container 1*a*) (see FIG. 2).

A front end side of the support member 13, namely, a front end side of the pedestal portion 131 has a narrower shape that extends along a corner of an inner wall of the case (see FIG. 1). Thus, the position of the pedestal portion 131 is restricted by this corner. Accordingly, even when the reel 2 rotates, the pedestal portion 131 is held at a predetermined position inside the case 1, and the guide roller 15 attached to the pedestal portion 131 also is held at a predetermined position inside the case 1. It is preferable to hold the support member 13 at a predetermined position inside the case by utilizing a predetermined corner in the case in this way, because no other means for preventing the rotation of the support member 13 needs to be provided.

The pedestal portion 131 has a bearing 13*c* provided therein, for example. A shaft portion 15*b* of the guide roller 15 is pressed in the bearing 13*c*, whereby the guide roller 15 is attached to the pedestal portion 131. Thus, the guide roller 15 is rotatable around its shaft center.

As shown in FIG. 1, for example, the direction of the running tape 3 is restricted by the guide roller 15, and then the tape 3 is wound around the reel 2. Since the running tape 3 is subjected to a certain amount of tension, the tape 3 that passes on the guide roller 15 is pressed against the guide roller 15. Thus, the tape 3 that has passed on the guide roller 15 runs in a stabilized manner. Also, if the tape 3 whose running position deviates from a proper running position enters the case 1, the guide roller 15 acts so as to return the running position of the tape 3 to the normal position. Such a tape 3 whose running position has been restricted so as to run in a stabilized manner passes on the guide roller 15 and then is wound around the reel 2. Consequently, it is possible to suppress an adverse effect of the poor precision or the like of the drive system of the drive on the smooth tape winding, for example.

Moreover, in the tape cartridge according to the present embodiment, the guide roller 15 is supported not by the case 1 but by the reel 2 via the support member 13. Thus, even when the reel 2 moves vertically or horizontally, the guide roller 15 can follow the movement of the reel 2. Therefore, even when the reel 2 is inclined or displaced horizontally, for example, it still is possible to restrict the running position of the tape 3 using the guide roller 15 in synchronization with the reel movement, thus causing the tape 3 to run in a stabilized manner.

As described above, in the tape cartridge according to the present embodiment, the tape 3 can be wound stably at an arbitrary position of the hub portion 2*a* without being affected considerably by the positional displacement, etc. of the reel 2. Also, since the tape 3 that is supplied from or wound into the tape cartridge runs in a more stabilized manner, the accuracy of writing and reading data improves, so that the error of writing and reading data decreases.

In the case where the reel 2 has the flange 2*b* provide so as to extend from the end of the hub portion 2*a*, poor smoothness in winding of the tape 3 conventionally has been likely to cause a problem that the flange 2*b* and the edge of the tape 3 contact each other, thus damaging the tape 3. Further, the flange 2*b* sometimes is dropped during transportation and thus deformed. In this case, if the edge of the tape 3 partially projects outward due to the poor smoothness in winding of the tape 3, such a projecting portion sometimes becomes crimped. Because of the greatly smooth tape winding in the tape cartridge according to the present embodiment, the problem of the edge of the tape 3 being damaged and the problem of the tape 3 becoming crimped as described above are suppressed.

As a bearing structure of the bearing portion 13*a*, for example, a uniserial angular ball bearing, a deep groove ball bearing, a cylindrical roller bearing and the like that are conventionally well-known can be adopted. The material for the bearing portion 13*a* is not particularly limited but may be similar to that for a known bearing. However, as shown in FIG. 4B, it is preferably that an outer race 132 constituting the bearing portion 13*a* and the pedestal portion 13*b* are molded as one piece by injection molding or the like, for example. In this case, it is preferable that the outer race 132 and the pedestal portion 13*b* are made of a resin, for example, a polyacetal resin (POM), ultra high molecular weight polyethylene, polytetrafluoroethylene (PTFE) or the like. The materials for an inner race 133 and rolling elements 134 are not particularly limited, either, but may be metal such as steel or a resin similar to the outer race 132, for example.

The form and material for the bearing 13*c* for attaching the guide roller 15 rotatably to the pedestal portion 131 are not particularly limited, either. For example, the bearing 13*c* may be a bearing having a similar structure to the bearing portion 13*a*.

The shape of a portion 15*a* of the guide roller 15 that contacts the tape is not particularly limited but suitably is cylindrical, for example. When a longitudinal length L1 of the portion 15*a* is made larger than the width of the tape 3, the guide roller 15 can press the tape 3 uniformly over the entire width, resulting in still smoother tape winding.

The material for the guide roller 15 is not particularly limited but suitably is stainless steel, polyacetal (POM), polyurethane or the like, for example.

The material for the pedestal portion 131 is not particularly limited. either, but preferably is stainless steel, an aluminum alloy, polycarbonate, POM, ultra high molecular weight polyethylene, PTFE or the like, for example.

Additionally, the materials for the case 1 and the reel 2 are not particularly limited, either, but preferably are a polycarbonate (PC) resin, an acrylonitrile-butadiene-styrene (ABS) resin, a polyoxymethylene resin or the like, for example (see FIG. 1).

Embodiment 2

Figure 5:
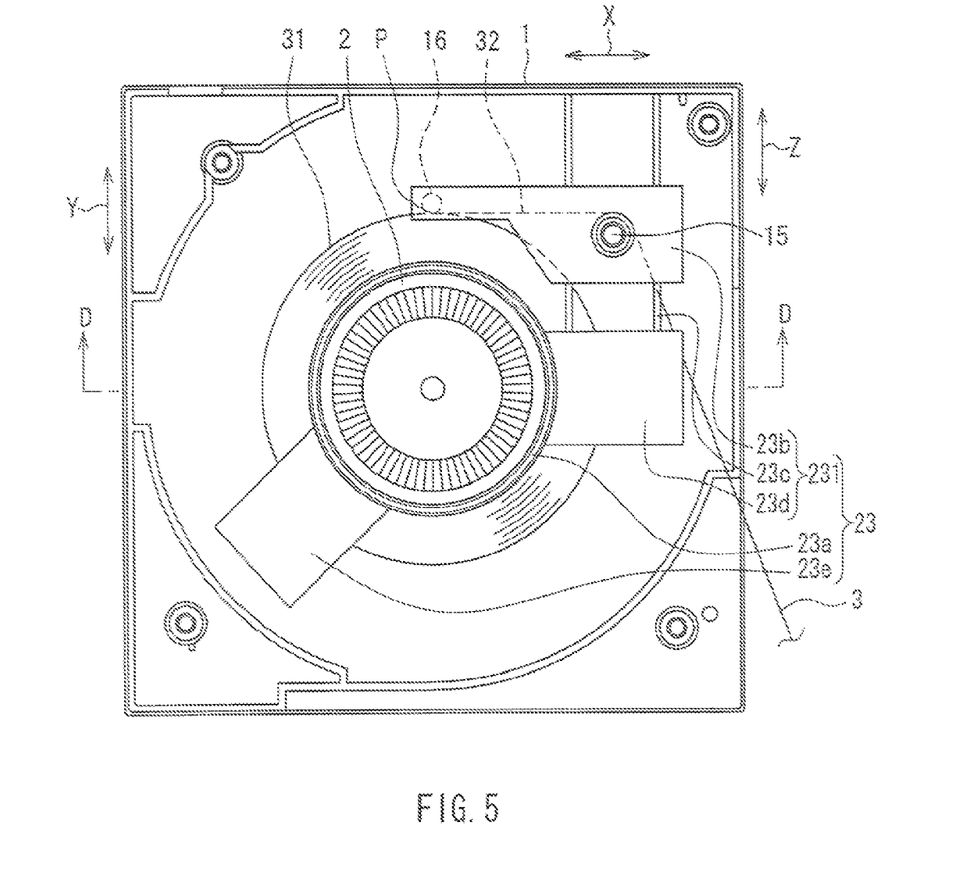
FIG. 5 is a conceptual plan view for describing an internal structure of an example of a tape cartridge according to Embodiment 2.
Figure 6:
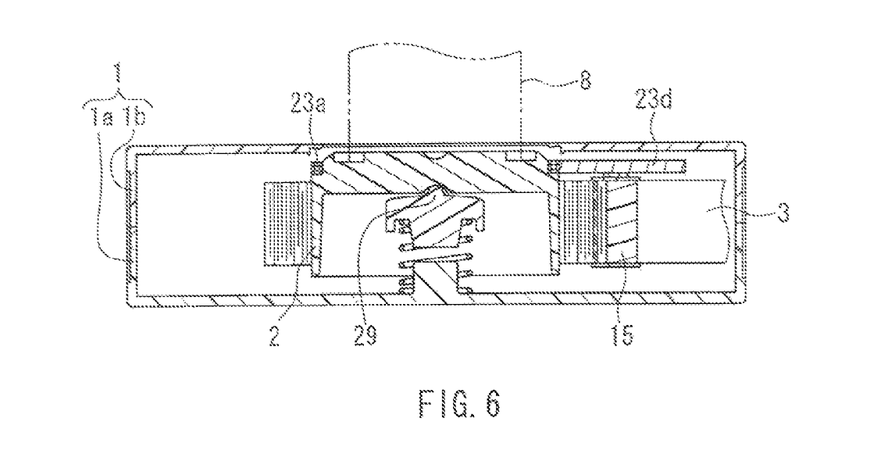
FIG. 6 is a sectional view showing the tape cartridge shown in FIG. 5, taken along a line D-D.
Figure 7:
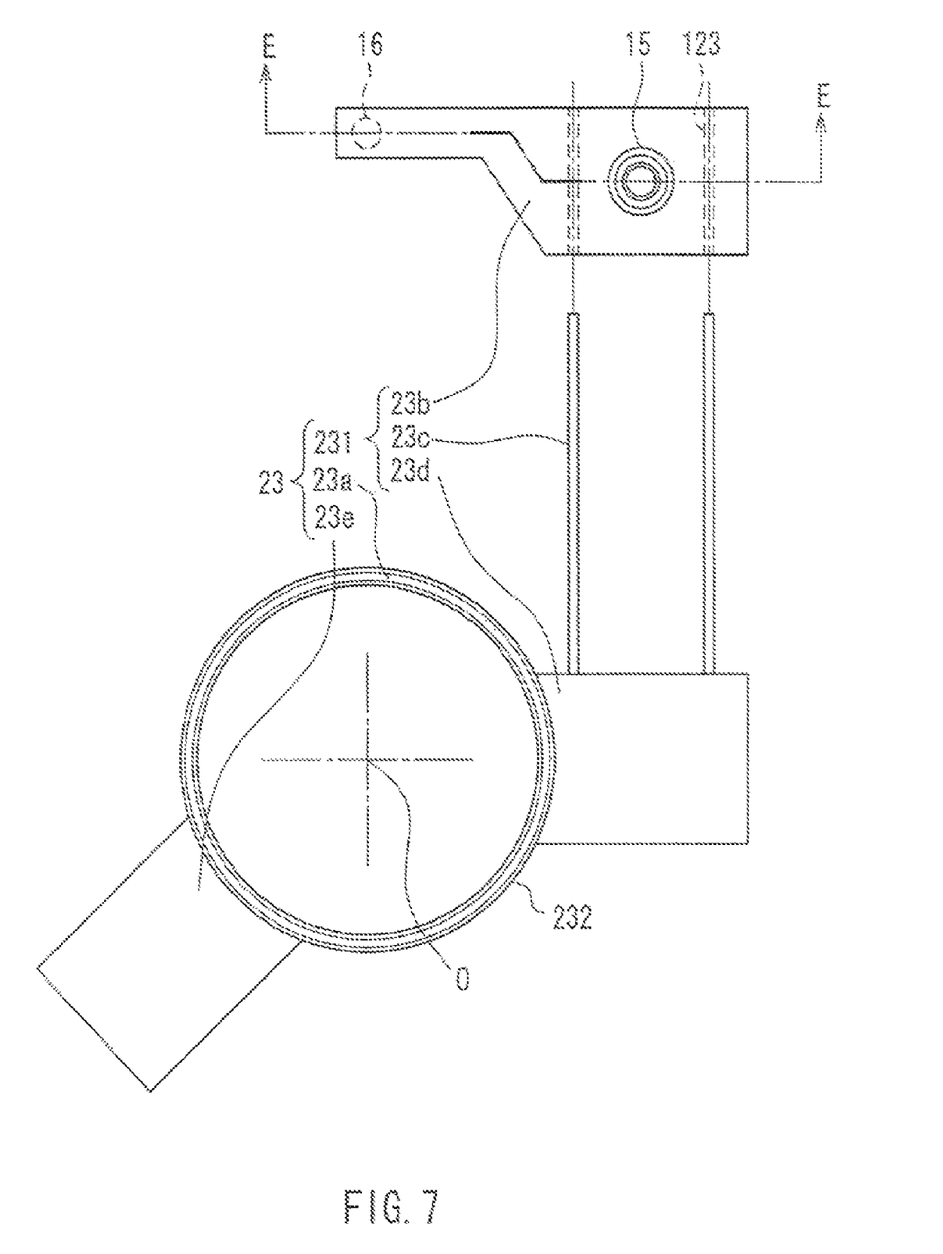
FIG. 7 is an exploded plan view showing a structure including a support member and a guide roller and a touch roller that are supported by the support member and constituting the tape cartridge shown in FIG. 5.
Figure 8:
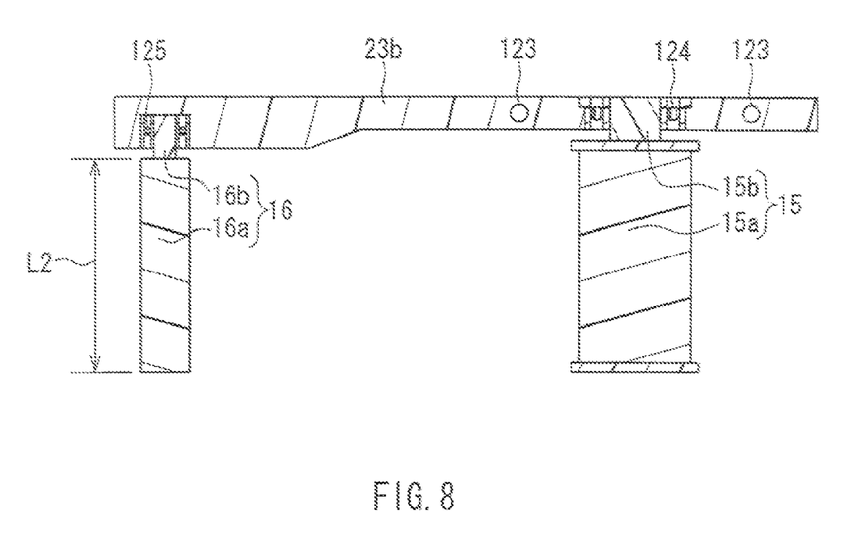
FIG. 8 is an enlarged sectional view of FIG. 7, taken along a line E-E.

FIG. 5 is a conceptual plan view for describing an internal structure of an example of a tape cartridge according to the present embodiment, and FIG. 6 is a sectional view showing the tape cartridge shown in FIG. 5, taken along a line D-D. FIG. 7 is an exploded plan view showing a support member constituting the example of the tape cartridge according to the present embodiment, and a guide roller and a touch roller (a pressing member) supported by the support member, and FIG. 8 is an enlarged sectional view of FIG. 7, taken along a line E-E. For convenience of description, in FIG. 5, the second container 1b shown in FIG. 6 is omitted. Further, although the first container 1a is disposed below the second container 1b in FIG. 6, the first container 1a is disposed above the second container 1b in ordinary use. In FIGS. 5 and 6, members that are the same as those in Embodiment 1 are given the same reference numerals, and the description thereof will be omitted.

As shown in FIGS. 5 and 6, in the tape cartridge according to the present embodiment, a reel 2 is formed of the hub portion alone and includes no flange. Further, as shown in FIG. 5, a support member 23 includes a bearing portion 23a, an arm portion 231 and a center-of-gravity adjusting portion 23e. The arm portion 231 includes rails 23c, a pedestal portion 23b that is slidable on the rails 23c and a connecting portion 23d that connects the rails 23c and the bearing portion 23a (see FIG. 7). In addition to the guide roller 15, a touch roller 16 (see FIG. 8) is attached to the pedestal portion 23b. Other than the above, the tape cartridge according to the present embodiment has a similar configuration to the tape cartridge according to Embodiment 1.

As shown in FIG. 7, the pedestal portion 23b has through holes 123 corresponding to the rails 23c. The rails 23c are passed through these through holes 123, whereby the pedestal portion 23b is supported by the rails 23c. Further, the pedestal portion 23b is freely slidable along the rails 23c.

As shown in FIG. 8, the guide roller 15 and the touch roller 16 are disposed on the side of one principal surface of the pedestal portion 23b. The pedestal portion 23b has bearings 124 and 125 provided therein. Shaft portions 15b and 16b of the guide roller 15 and the touch roller 16 are pressed in the bearings 124 and 125, respectively, for example, so that the guide roller 15 and the touch roller 16 are attached to the pedestal portion 23b.

As shown in FIGS. 5 and 7, since the pedestal portion 23b is supported by the reel 2 via the rails 23c, the connecting portion 23d and the bearing portion 23a, the guide roller 15 and the touch roller 16 attached to the pedestal portion 23b can follow the vertical movement of the reel 2 and vary their positions. The pedestal portion 23b operates by the difference between a force exerted on the guide roller 15 from the tape 3 and a reaction force transmitted to the touch roller 16 caused by an increase in the diameter of a wound portion 31 of the tape 3.

As shown in FIG. 5, the touch roller 16 acts such that a non-wound portion 32 of the tape 3 is pressed against the wound portion 31 at the same time when the non-wound portion 32 of the tape 3 come into contact with the wound portion 31. In other words, the touch roller 16 presses the tape 3 against the wound portion 31 at a contact starting point P of the running tape 3 (the non-wound portion 32) and the wound portion 31. Accordingly, at the instant when the tape 3 is wound, the entrained air is removed. Further, it also is possible to suppress the vibration of the tape 3 and the flutter of the tape 3. The tape 3 whose running has been stabilized by the guide roller 15 as described above always travels toward the reel 2 at a constant angle of approach while following the positional displacement, inclination, etc. of the reel 2. Then, the tape 3 is wound while the entrainment of the air is suppressed by the pressing of the touch roller 16. Thus, it is possible to provide a tape cartridge with still smoother tape winding. It should be noted that the touch roller 16 is in contact with the reel 2 when the tape 3 is not wound around the reel 2 at all.

In the example illustrated by FIG. 5, the touch roller 16 and the guide roller 15 are attached to the pedestal portion 23b such that the tape 3 running from the guide member 15 toward the touch roller 16 (the non-wound portion 32) and a radial direction Y of the wound portion 31 passing through the contact starting point P cross at right angles, in other words, the touch roller 16 and the guide roller 15 are attached to the pedestal portion 23b such that the tape 3 running from the guide member 15 toward the touch roller 16 runs on a tangent line passing through the contact starting point P. A moving direction Z of the pedestal portion 23b that slides along the rails 23c is parallel with the radial direction Y of the wound portion 31 passing through the contact starting point P. Therefore, a traveling direction X of the tape 3 between the guide roller 15 and the touch roller 16 always is a direction of the above-noted tangent line. In the case, the contact area of the touch roller 16 and the tape 3 can be made minimal.

When the traveling direction X of the tape 3 running between the guide roller 15 and the touch roller 16 and the direction of the tangent line passing through the contact starting point P form a relatively large angle, the contact area of the touch roller 16 and the tape 3 is large. Accordingly, the shape, etc. of the touch roller 16 has a considerable adverse effect on the smooth tape winding. Therefore, by minimizing the contact area of the touch roller 16 and the tape 3, it is possible to suppress the adverse effect on the smooth tape winding due to the shape, etc. of the touch roller 16.

Incidentally, to "cross at right angles" here is not restricted to the case of crossing at 90° in a strict sense but also includes the case of crossing at substantially right angles, for example, within the range of manufacturing error. Further, the "parallel" noted above is not restricted to the case of being parallel in a strict sense but also includes the case of being substantially parallel, for example, within the range of manufacturing error.

As shown in FIG. 5, front ends of the rails 23c contact an inner surface of the case 1. This prevents the support member 23 from rotating in synchronization with the rotation of the reel 2. However, in the case where other means for preventing the rotation of the support member 23 are provided, the front ends of the rails 23c do not have to contact the inner surface of the case 1.

The rail 23c is a rod-like member, fro example, and has a circular cross-section, for example. However, the shape of the rail 23c is not particularly limited as long as the pedestal portion 23b is slidable in a longitudinal direction of the rail 23c according to the increase or decrease in the diameter of the wound portion 31 of the tape 3. For example, the rail 23c may have a rectangular cross-section. Further, the number of the rails 23c is not particularly limited, either, as long as the pedestal portion 23b can be held stably, and may be 1, 2 or more. The thickness of the rail 23c is not particularly limited, either.

As shown in FIG. 7. the support member 23 includes the center-of-gravity adjusting portion 23e, thereby achieving an improved weight balance such that a center O of the bearing portion 23a with a ring-like outer shape is at the center of gravity of the structure constituted by the support member 23, the guide roller 15 and the touch roller 16. Thus, the weight of the support member is applied evenly to the reel, so that irregular rotation of the reel caused by the reel inclination can be prevented.

It is preferable that an outer race 232 of the bearing portion 23a, the connecting portion 23d and the center-of-gravity adjusting portion 23e are molded as one piece by injection molding or the like, for example. The rails 23c may be molded simultaneously with the molding of the connecting portion 23d formed of a resin. Alternatively, the rails 23c may be formed seperately from the connecting portion 23d and then fixed to the connecting portion 23d by adhesion using an adhesive, fitting or the like.

The bearing 124 for fixing the guide roller 15 to the pedestal portion 23b rotatably may have any form and material without particular limitation and, for example, may be a bearing having a similar structure to the bearing portion 23a. Likewise, the bearing 125 for fixing the touch roller 16 to the pedestal portion 23b rotatably may have any form and material and, for example, may be a bearing having a similar structure to the bearing portion 23a (see FIG. 8).

As shown in FIG. 8, the shape of a portion 16a of the touch roller 16 that contacts the tape is not particularly limited but suitably is cylindrical, for example. It is preferable that a longitudinal length L2 of the portion 16a is made larger than the width of the tape 3, because the touch roller 16 can press the tape 3 uniformly over the entire width. As a result, it is possible to achieve still smoother tape winding. Although the material for the touch roller 16 is not particularly limited, the surface that contacts the tape 3 suitably is made of rubber, for example.

The shape of the pedestal portion 23b is not particularly limited as long as the guide roller 15 and the touch roller 16 can be supported, but suitably is like a plate. The material for the pedestal portion 23b is not particularly limited but suitably is stainless steel, polycarbonate or the like, for example.

The guide roller 15 may be similar to the guide roller constituting the tape cartridge according to Embodiment 1, for example.

In the examples illustrated with reference to FIGS. 5 to 8, the touch roller 16 is adopted as an example of the pressing member. However, the pressing member is not limited to the touch roller. The pressing member may be, for example, a sheet-like member whose one end is fixed to the pedestal portion 23b. The sheet-like member is more preferable than the touch roller in that it can be placed in a small space. When the pressing member is the above-noted sheet-like member, it is preferable that the sheet-like member curves at a position corresponding to the contact starting point P. Also, it is preferable that the surface of the sheet-like member that contacts the tape contains at least one low friction material selected from the group consisting of a fluorocarbon resin, a silicone resin and ultra high molecular weight polyethylene.

In the example illustrated by FIG. 4, the support member 13 does not include the center-of-gravity adjusting portion 23e (see FIG.7). However, the support member 13 may include the center-of-gravity adjusting portion such that the center of the bearing portion 13a is at the center of gravity of the structure constituted by the support member 13 and the guide roller 15.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

As described above, in accordance with the present invention, since the guide member for tape guidance is supported by the support member supported by the reel, the running position of the tape can be restricted stably using the guide member without being affected considerably by the inclination, positional displacement, etc. of the reel. Accordingly, it is possible to provide a tape cartridge with smoother tape winding.

What is claimed is:

1. A tape cartridge comprising:
   a case;
   a reel disposed in the case;
   a tape wound around the reel in such a manner as to be fed out freely; and
   a guide member for tape guidance disposed in the case;
   wherein the guide member is supported by a support member, the support member being held at a predetermined position inside the case and supported by the reel without interfering with a rotation of the reel,
   the guide member is not supported by the case, and
   the support member comprises a bearing portion disposed in contact with the reel.

2. The tape cartridge according to claim 1, wherein the guide member is a guide roller supported by the support member in such a manner as to be rotatable around a center shaft of the guide roller.

3. The tape cartridge according to claim 1, wherein a position of the support member is restricted by a predetermined corner in the case.

4. The tape cartridge according to claim 1, wherein the reel comprises a cylindrical hub portion with a bottom.

5. The tape cartridge according to claim 4, wherein the reel comprises an annular step portion formed on an outer periphery near the bottom of the hub portion, and
   the bearing portion is disposed in contact with the annular step portion.

6. The tape cartridge according to claim 4, wherein the support member comprises an arm portion provided so as to extend from the bearing portion in a direction perpendicular to a height direction of the hub portion, and
   the guide member is attached to the arm portion.

7. The tape cartridge according to claim 6, wherein the arm portion is formed of a plate-like pedestal portion.

8. The tape cartridge according to claim 6, wherein the arm portion comprises
   a pedestal portion to which the guide member is attached, and
   a rail that allows the pedestal portion to slide according to a change in a diameter of a wound portion of the tape, and
   wherein the tape cartridge further comprises a pressing member, the pressing member allowing a non-wound portion of the tape to be pressed against the wound portion at a contact starting point of the non-wound portion and the wound portion and being attached to the pedestal portion.

9. The tape cartridge according to claim 8, wherein the pressing member is a touch roller attached to the pedestal portion in such a manner as to be rotatable around a center shaft of the touch roller.

10. The tape cartridge according to claim 8, wherein the pressing member and the guide member are attached to the pedestal portion such that a running direction of the tape running from the guide member toward the pressing member and a radial direction of the wound portion passing through the contact starting point cross at right angles, and a moving direction of the pedestal portion that slides along the rail is parallel with the radial direction of the wound portion passing through the contact starting point.

11. The tape cartridge according to claim 8, wherein the bearing portion has a ring-like outer shape, and the support member further comprises a center-of-gravity adjusting portion that is provided in the bearing portion such that a center of the bearing portion is at a center of gravity of a structure constituted by the support member, the guide member and the pressing member.

12. The tape cartridge according to claim 4, wherein the case is formed by combining a first container and a second container so as to form an internal space, a bottom of the second container is provided with an opening portion from which an outer surface of the bottom of the hub portion is exposable, and in the case, the reel is pressed and biased toward the second container by a compression coil spring.

\* \* \* \* \*